United States Patent [19]

Eberle

[11] Patent Number: 4,535,586

[45] Date of Patent: Aug. 20, 1985

[54] METHOD OF CONTAINING, STORING, AND TRANSPORTING AGRICULTURAL PRODUCTS IN A HIGH MOISTURE CONDITION

[75] Inventor: John W. Eberle, Cedar Bluffs, Nebr.

[73] Assignee: Hawkeye Container Company, Omaha, Nebr.

[21] Appl. No.: 201,163

[22] Filed: Oct. 27, 1980

[51] Int. Cl.³ .............................................. B65B 3/04
[52] U.S. Cl. ...................................... 53/432; 53/408; 53/510; 426/419
[58] Field of Search ......................... 53/408, 432, 510; 410/49, 50; 426/419, 418, 410; 99/467

[56] References Cited

U.S. PATENT DOCUMENTS

| | | | |
|---|---|---|---|
| 1,661,001 | 2/1928 | Madden et al. | 410/50 X |
| 2,353,029 | 7/1944 | Graham, Jr. | 426/419 X |
| 2,412,167 | 12/1946 | Minaker | 53/408 |
| 2,494,454 | 1/1950 | Ritchie | 53/408 |
| 2,987,404 | 6/1961 | Beckmann | 426/418 |
| 3,013,807 | 12/1961 | Winterhoff | 410/50 X |
| 3,365,307 | 1/1968 | Dixon | 426/419 X |
| 3,818,955 | 6/1974 | Kline | 53/510 X |
| 4,055,931 | 11/1977 | Myers | 53/408 |
| 4,175,666 | 11/1979 | Smith | 410/49 X |

FOREIGN PATENT DOCUMENTS 5614 6/1828 United Kingdom .............. 426/419

Primary Examiner—James F. Coan
Attorney, Agent, or Firm—Zarley, McKee, Thomte, Voorhees & Sease

[57] ABSTRACT

A materials handling method includes the steps of closing and sealing a permanent reusable container to enclose a material in a fluid tight condition. The air in the container is then displaced with a substitute gas so that the material may be transported and stored in air free standard unit measures. The apparatus of the invention is directed to the generally rigid fluid tight container having at least one access opening and a door for closing and sealing the same. A valve mechanism on the container enables air to be removed from the container either by evacuation or substitution by another gas.

7 Claims, 7 Drawing Figures

U.S. Patent   Aug. 20, 1985   4,535,586
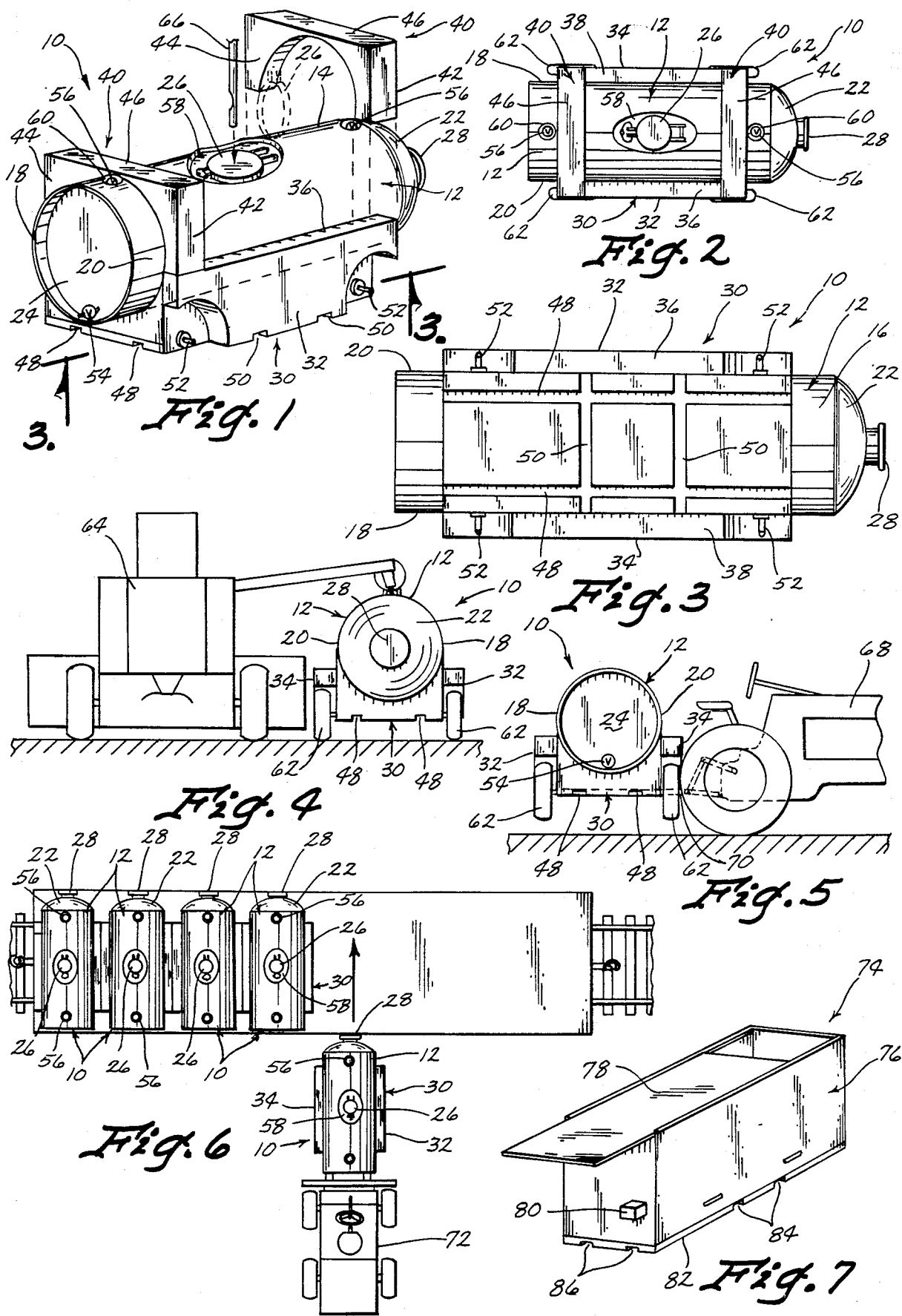

METHOD OF CONTAINING, STORING, AND TRANSPORTING AGRICULTURAL PRODUCTS IN A HIGH MOISTURE CONDITION

BACKGROUND OF THE INVENTION

The present invention is directed generally to an improved materials handling apparatus and method and more particularly to a permanent and reusable standard unit container provided with valves through which the air in the container may be removed and/or displaced by a substitute gas.

Presently known materials handling systems for grains, fruits, vegetables and other perishable liquid and solid goods generally result in certain field, transportation and storage losses of the products which can be very costly to the producer and/or marketer of the products.

With particular reference to grain products, each year around harvest time they are generally stockpiled in the open in shipping yards to await available transportation to market. Heretofore, the usual methods of transportation have been via rail grain cars, grain trucks or other such devices with seasonal limitations. After this seasonal use, the hopper cars must be stored for the next season's use. It is clearly uneconomical to keep and maintain expensive specialized devices that are used only a short period of the year as are the hopper cars.

Product losses add to the expense of present grain handling systems. The loss incurred from stockpiling and environmental conditions is estimated to be from ten to fifteen percent of the product. Along with this, it is known that the American farmer currently spends between fifteen and twenty-five cents per bushel of grain for drying and additional labor expense incurred in readying his product for market in open storage. Repeated handling of the grain such as by augering results in breakage of individual grains and exposure of the grain to the environment renders it subject to further deterioration during storage.

Fruits and vegetables are subject to damage during shipping from handling, weather, moisture, spoilage as well as rodents, their waste and other environmental conditions.

Finally, certain products such as toxic chemicals, explosives and spoiled food products may pose a substantial threat to the environment during shipment due to the danger of leakage or odorous fumes associated with them.

Accordingly, it is primary object of the invention to provide an improved materials handling apparatus and method.

Another object is to provide an improved materials handling system which eliminates the need for repeated handling of the material itself.

Another object is to provide a materials handling system utilizing standard unit containers adapted to be sealed and to have the air therein displaced by a substitute gas.

Another object is to provide an improved materials handling system including permanent reusable containers compatible with existing flatcars, trucks, warehouses, cargo planes, ships and the like.

Another object is to provide a materials handling system which minimizes product losses during storage and shipment.

Another object is to provide a materials handling apparatus which is readily adaptable to handling with existing machinery and to storage in existing facilities.

Another object is to provide an improved materials handling apparatus which is simple and durable in construction, and efficient and economical in operation.

These and other objects of the invention are believed to be resolved by the improved materials handling apparatus and method of the present invention.

SUMMARY OF THE INVENTION

The materials handling method of the present invention basically includes the steps of providing a permanent reusable container, inserting a material into the container, closing and sealing the container in a substantially fluid tight condition, displacing the air in the container with a substitute gas, and transporting the container with the material therein.

Grain products, for example, may be directed into the containers at the harvesting site and be sampled, sealed and certified right in the field before storage or mixture with any foreign substances or other grains. Grain thus moves from the producer to the end user without any further direct handling of the grain or exposure to the ambient environment. The displacement of air with $CO_2$ or the like arrests bacteria growth and thereby enables the shipment of grains having a higher moisture content than is presently customary. This feature alone saves time and money previously associated with grain drying operations. The elimination of direct handling of fruits and vegetables improves the product quality and the storage of the same in an air free environment preserves them for marketing in a fresh condition.

The materials handling apparatus of the present invention includes a generally rigid reusable standard unit container having at least one access opening. A door is provided for closing and sealing the access opening in a fluid tight condition. Finally, one or more valves are provided on the container for displacing the air therein once the access opening is closed and sealed by the door. The container is adapted to be stationarily supported on a flat surface and is readily adaptable for handling as a wheeled vehicle itself or by existing machinery such as an agricultural stack mover, forklift, crane or the like. Since the sealed containers can then be transported on existing railroad flatcars, cargo ships and planes, the need for specialized equipment suitable for only seasonal usage is substantially eliminated.

The structure and method of accomplishing the above-identified objects will become apparent from the following detailed description of the invention and accompanying drawings.

BRIEF DESCRIPTION OF THE DRAWINGS

FIG. 1 is a perspective view of a container suitable for handling grain and shows a grain probe positioned for insertion therein;

FIG. 2 is a reduced top view of the container of FIG. 1;

FIG. 3 is an enlarged bottom view of the container of FIG. 1;

FIG. 4 is a diagrammatic end view showing the container being filled directly from a combine in the field;

FIG. 5 is a diagrammatic end view showing the container being lifted on the bale handling tines of an agricultural tractor;

FIG. 6 is a diagrammatic top view of a container being lifted on a forklift truck onto a railroad flatcar; and FIG. 7 is a perspective view of an alternate embodiment of the invention.

DESCRIPTION OF THE PREFERRED EMBODIMENTS

The materials handling apparatus 10 of the present invention is shown in a preferred embodiment in FIGS. 1-3 as including a generally rigid container 12 having a top wall 14, bottom wall 16, and sidewalls 18 and 20 which form a cylinder. A forward end wall 22 and rearward end wall 24 complete the container. Access to the container is provided through top and forward access openings which are covered by a top hatch 26 and forward hatch 28 respectively. The forward end wall 22 tapers forwardly toward the forward hatch 28 to facilitate the emptying of material from the container.

The container 12 is supported on a cradle frame 30 to which it is secured by straps, adhesives, or any other suitable means. The cradle frame 30 enables the apparatus 10 to be stationarily supported on a flat surface and furthermore facilitates handling of the apparatus without damage to the container 12.

Cradle frame 30 is provided as an elongated open ended trough shaped structure with spaced apart sidewalls 32 and 34 defining ledges 36 and 38 which extend horizontally outwardly from the container 12. The ledges provide a support surface for removable yokes 40 which may be placed on the cradle frame 30 for supporting additional apparatus 10 in vertically stacked relation. Each yoke 40 includes a pair of spaced apart legs 42 and 44 connected by a cross bar 46 which is adapted to overlie the container 12. The legs and cross bar together define an arcuate inner periphery adapted to conform to the exterior periphery of the container 12 so as to securely position the yoke relative to the cradle frame, yet without causing weight to be borne by the container 12 itself.

Handling of the cradle frame 30 is facilitated by the longitudinal and transverse tine slots 48 and 50, shown best in the bottom view of FIG. 3. In addition, each cradle frame may be provided with a plurality of stub shafts 52 extended transversely therefrom for temporarily receiving ground wheels so that the apparatus 10 may be towed to and from a farmer's field, for example, as an independent wheeled vehicle.

Container 12 is adapted to store material in an air free environment to prevent the growth of bacteria due to moisture and otherwise prevent deterioration of the material during shipping. For this purpose, an inlet valve 54 is installed in the rearward end wall 24 in communication with a lower portion of the container for directing a replacement gas into the container. Air in the container is exhausted through exhaust valves 56 in the container top wall 14, which may be provided as one-way valves. Carbon dioxide is an economical substitute gas suitable for use when shipping grain and the like. Since carbon dioxide is heavier than air, the air tends to float above the level of $CO_2$ in the container and exhaust through valves 56 as the container is filled with $CO_2$. If a substitute gas which is lighter than air is to be used, it is apparent that the inlet valve should be provided adjacent the top of the container and the exhaust adjacent the bottom of the container.

Both the top hatch 26 and exhaust valves 56 may be situated within respective recesses 58 and 60 in top wall 14 so as to protect them from abutment by foreign objects during handling.

In operation, for handling grain, ground wheels 62 may be installed on the stub shafts 52 so that the apparatus 10 may be wheeled onto a farmer's field at the harvesting location. Grain which is collected by a combine 64 or other harvesting apparatus may be emptied directly into the container 12 as diagrammatically indicated in FIG. 4. For purposes of certifying the contents of the container to a government inspector or grain buyer, a sample of the grain may be immediately taken with a grain probe 66 (FIG. 1) whereupon top hatch 26 may be closed, locked and provided with a wire and lead closure 68 (FIG. 2), for example. A source of pressurized $CO_2$ may then be connected to the inlet valve 54 for driving all air out of the container 12. The top and forward hatches 26 and 28 are of a fluid tight construction so that the material is permanently isolated from the ambient environment during shipping.

Handling of the apparatus 10 can then be easily accomplished with existing machinery. Referring to FIG. 5, for example, a tractor 68 equipped with stack moving tines 70 may insert the tines within the transverse slots 50 and support the apparatus in ground clearance relation for removing the ground wheels 62 and loading the apparatus onto a truck, wagon or the like. The containers may then be transported in unison to a railroad yard wherein a forklift 72 (FIG. 6) can transfer the apparatus 10 to standard flatcars for shipment to any destination. For international shipments, the standardized unit containers of the present invention are ideally adapted for loading and transport on conventional cargo ships and planes, thereby eliminating the need for specialized carriers adapted for only seasonal use.

While a preferred embodiment has been discussed hereinabove, it will be apparent that many modifications, substitutions and alterations may be made which come within the intended broad scope of the invention as defined in the appended claims. For example, an alternate embodiment of the invention is shown in FIG. 7 wherein the apparatus 74 is provided as a rectangular shaped container 76 having a top surface 78 which is movably slide-fit onto the container for closing and sealing the same when moved to a fully closed position. The oxygen or air removal valve may be positioned in a control box 80 on one end of the container 76. For handling purposes, the container 76 is supported on and secured to a flat frame structure 82 providing transverse and longitudinal tine slots 84 and 86, as in the prior embodiment.

Other possibilities would include providing a detachable cradle for the containers, which cradle may be provided with a scissors-type linkage for raising the container to any height desired. Alternately, such a cradle may be provided with a dump cylinder for pivotally raising one end of the container to empty the contents therefrom.

The material from which the containers are constructed is not critical to the present invention as both metal and plastic containers are envisioned. Regardless of the particular material, it is thought that for safety reasons, the containers should be designed with a capability of withstanding a ten foot drop.

In the preferred embodiment, the containers may be constructed to have an outside diameter of approximately 6 feet 6 inches and an overall length of 10 feet so that approximately nine of the apparatus may be arranged in side-by-side relation on a standard railroad flatcar. Such containers would hold approximately 260 bushels or 320 cubic feet and weight approximately 12 ton when filled with corn, for example. Other options would include the provision of a heat coil or refrigerating coil for specialized applications.

The standard unit size of the containers, being much smaller than a railroad tank car, for example, has several practical advantages. Besides the capability of marketing bulk commodities in smaller unit measures, there is an inherent safety factor in that if one container should develop a leak in the event of an accident or the like, the material in the remaining containers on the same railroad car, cargo ship or the like, would not be lost. This is particularly advantageous for the transportation and storage of toxic chemicals wherein the environmental impact of an accident will necessarily be decreased in proportion to the unit size of the containers.

A replaceable plastic liner may be provided to cover the interior surface of the containers. This would eliminate the need for scrubbing and cleaning of the containers between uses for different materials.

The materials handling system of the present invention is particularly suited for use in connection with alcohol production plants. Grain, potatoes or whatever the alcohol is to be produced from may be easily transported to the plant from the field in the apparatus of the present invention as described above. By providing the plastic liners mentioned above, the same containers can be used for transporting from the plant the various by-products of alcohol production such as the wet distiller's grains or mash. The sealed air free containers of the present invention stop further deterioration and eliminate any ecology problems which might otherwise be presented by transportation of such odorous materials through urban areas. The containers can be returned to the farm where the by-products may be used as an excellent cattle feed product, for example. Thus a cycle is developed which results in substantially complete utilization of the materials handling apparatus between the farm and alcohol production plant.

In addition, the very use of the materials handling apparatus of the present invention opens up new possibilities of source products for the alcohol production plants. For example, in Georgia and the Carolinas recently, the corn crop was found to have an affitoxin which rendered it unsuitable for human consumption, including the feeding of corn to livestock for meat production. Such crop could be salvaged, however, by harvesting the same into plastic lined containers of the present invention, thereby avoiding contamination of the containers, and shipping the same to alcohol production plants wherein the fermentation temperatures kill the affitoxin. Thus an economic outlet is provided for a previously valueless corn crop.

In a similar example, when milo becomes wet, it gets sour and produces strong odors which would prevent shipment of the same by conventional means. By sealing the product within the containers of the present invention, however, it can be shipped to alcohol production plants with no environmental impact and readily used as source material for alcohol production.

Thus there has been shown and described herein a materials handling apparatus and method which accompishes at least all of the stated objects.

I claim:

1. A method of containing and storing agricultural products in a high moisture condition, comprising,
   providing a generally rigid permanent reusable container having a product opening, an inlet valve and an exhaust valve,
   substantially filling said container by inserting an agricultural product into said container through said product opening,
   closing and sealing said product opening and container in a substantially fluid tight condition,
   displacing the air from said container to the ambient atmosphere through said exhaust valve,
   connecting said inlet valve to a source of a substitute gas, replacing said air with the substitute gas, and
   disconnecting said inlet valve from said source of substitute gas whereby said agricultural product is independently preserved in said generally rigid container in a high moisture condition.

2. The method of claim 1 further comprising transporting said container with said agricultural product therein.

3. The method of claim 2 further comprising assembling ground wheels onto said generally rigid container to form a wheeled assembly, transporting said assembly on the ground to a loading site, transporting the loaded assembly to a primary transport medium capable of carrying and transporting a plurality of said containers, disassembling said ground wheels from said containers, and loading said containers onto said primary transport medium.

4. The method of claim 3 further comprising arranging a plurality of said containers in adjacent stacked relation for shipping in unison.

5. The method of claim 4 further comprising certifying as to the contents of said container.

6. The method of claim 5 further comprising providing a pliant liner within said container whereby said agricultural product is kept from direct contact with said container.

7. The method of claim 6 wherein said substitute gas comprises carbon dioxide.

* * * * *